US008680189B2

(12) United States Patent
Yamauchi et al.

(10) Patent No.: US 8,680,189 B2
(45) Date of Patent: Mar. 25, 2014

(54) BINDER RESIN, VEHICLE COMPOSITION, AND PASTE COMPOSITION HAVING INORGANIC MICROPARTICLE DISPERSED THEREIN

(75) Inventors: Kenji Yamauchi, Osaka (JP); Hiroshi Hiraike, Osaka (JP); Hiroji Fukui, Osaka (JP); Shintaro Moriguchi, Osaka (JP); Hiroko Miyazaki, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 394 days.

(21) Appl. No.: 12/733,502

(22) PCT Filed: Sep. 5, 2008

(86) PCT No.: PCT/JP2008/066109

§ 371 (c)(1), (2), (4) Date: Apr. 23, 2010

(87) PCT Pub. No.: WO2009/031663

PCT Pub. Date: Mar. 12, 2009

(65) Prior Publication Data

US 2010/0222462 A1 Sep. 2, 2010

(30) Foreign Application Priority Data

Sep. 7, 2007 (JP) ................................ 2007-233141

(51) Int. Cl.
*C08K 5/00* (2006.01)

(52) U.S. Cl.
USPC ............................ 524/291; 524/384; 526/320

(58) Field of Classification Search
USPC .................................. 526/320; 524/291, 384
See application file for complete search history.

(56) References Cited

U.S. PATENT DOCUMENTS

| | | | | |
|---|---|---|---|---|
| 3,671,476 | A * | 6/1972 | Terai et al. | 524/423 |
| 6,270,905 | B1 * | 8/2001 | Swarup et al. | 428/463 |
| 2004/0176558 | A1 * | 9/2004 | Coca et al. | 526/348.7 |

FOREIGN PATENT DOCUMENTS

| | | |
|---|---|---|
| JP | 6-56511 | 3/1994 |
| JP | 11-71132 | 3/1999 |
| JP | 2000-007442 | 1/2000 |
| JP | 2004-315719 | 11/2004 |
| JP | 2006-308973 | 11/2006 |
| JP | 2007-171311 | 7/2007 |

OTHER PUBLICATIONS

International Search Report issued Oct. 14, 2008 in International (PCT) Application No. PCT/JP2008/066109.

* cited by examiner

*Primary Examiner* — Peter D Mulcahy
(74) *Attorney, Agent, or Firm* — Wenderoth, Lind & Ponack, L.L.P.

(57) ABSTRACT

It is an object of the present invention to provide a binder resin which, when used in an inorganic fine particle-dispersed paste composition, leaves little amount of residual carbon after sintering and can be degreased even under low temperature conditions. It is also an object of the present invention to provide a vehicle composition and an inorganic fine particle-dispersed paste composition, which are obtained by using the binder resin.

The binder resin of the present invention is for use in an inorganic fine particle-dispersed paste composition containing inorganic fine particles. The binder resin contains from 5 to 55% by weight of a segment derived from methyl methacrylate, from 30 to 80% by weight of a segment derived from isobutyl methacrylate, and from 5 to 20% by weight of a segment derived from polyoxyalkylene ether monomethacrylate.

4 Claims, 1 Drawing Sheet

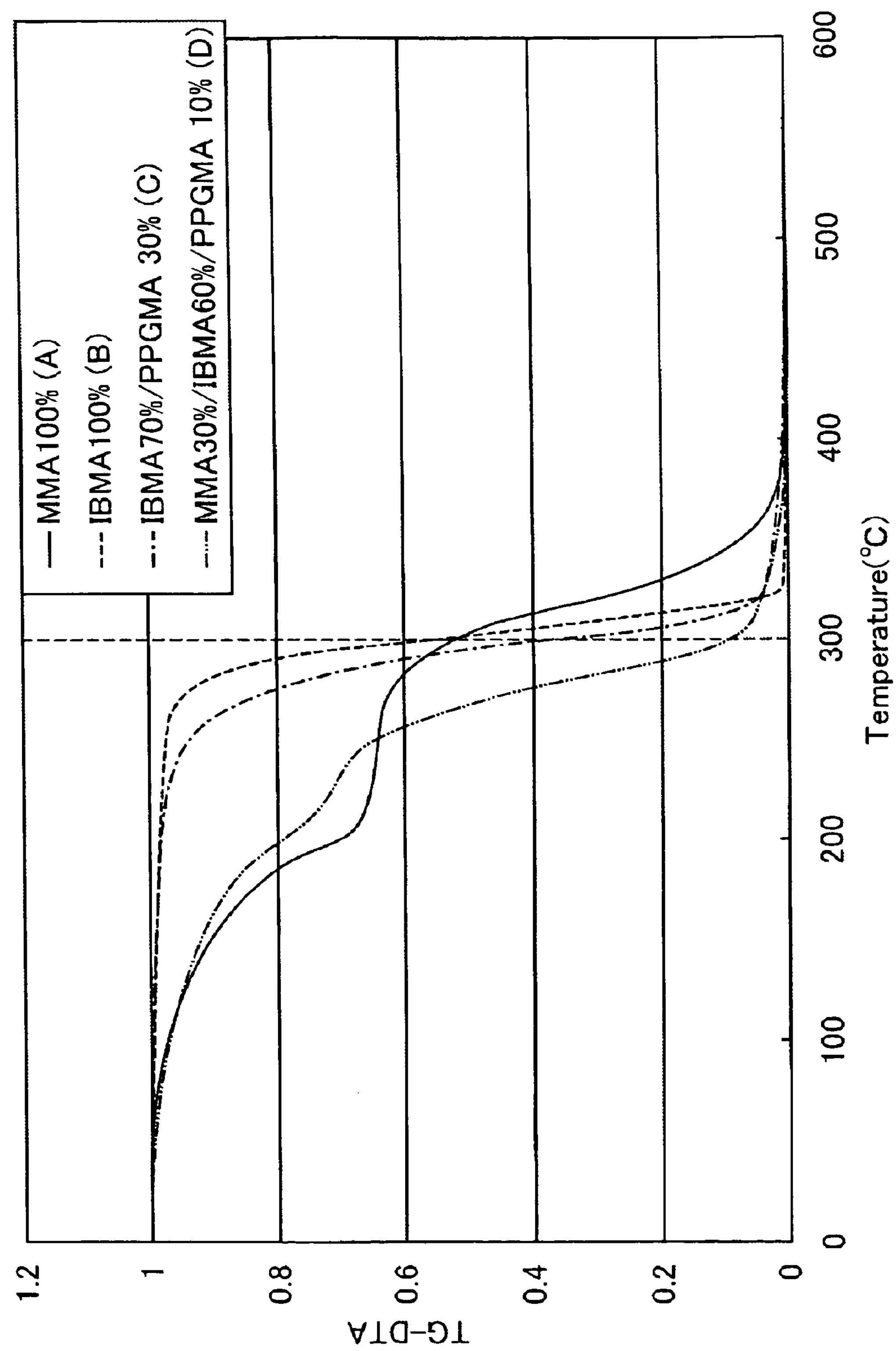
MMA100% (A)
IBMA100% (B)
IBMA70%/PPGMA 30% (C)
MMA30%/IBMA60%/PPGMA 10% (D)
TG-DTA
1.2
1
0.8
0.6
0.4
0.2
0
0
100
200
300
400
500
600
Temperature(°C)

BINDER RESIN, VEHICLE COMPOSITION, AND PASTE COMPOSITION HAVING INORGANIC MICROPARTICLE DISPERSED THEREIN

This application is a U.S. national stage of International Application No. PCT/JP2008/066109 filed Sep. 5, 2008.

TECHNICAL FIELD

The present invention relates to a binder resin which, when used in an inorganic fine particle-dispersed paste composition, leaves little amount of residual carbon after sintering and can be degreased even under low temperature conditions. The present invention further relates to a vehicle composition and an inorganic fine particle-dispersed paste composition, which are obtained by using the binder resin.

BACKGROUND ART

In recent years, an inorganic fine particle-dispersed paste composition, which is provided by dispersing inorganic fine particles such as electrically conductive powders, ceramic powders, and glass powders in a binder resin, has been used to obtain a fired body of various shapes. For example, an electrically conductive paste provided by dispersing electrically conductive powders in a binder resin has been used for formation of a circuit, production of a capacitor, or the like. Also, a ceramic paste or a glass paste provided by dispersing ceramic powders or glass powders, respectively, in a binder resin has been used in production of a dielectric layer of a plasma display panel (hereinafter, referred also to as PDP), a laminated ceramic capacitor, or the like.

A sintered body of the aforementioned kind of inorganic fine particle-dispersed paste composition in a desired shape is obtainable when the inorganic fine particle-dispersed paste composition is processed into a predetermined shape by, for example, screen printing, coating using a doctor blade, casting for sheet processing, or some other methods, and then fired. Screen printing is especially suitable for mass production among the exemplified methods.

Currently, ethylcellulose is often used as a binder resin for printing materials. An inorganic fine particle-dispersed paste composition for printing is printed on a substrate, and then heated and fired for thermal decomposition of the binder resin so as to provide a layer consisting of inorganic fine particles. However, the firing needs to be performed at high temperatures to prevent organic matters from remaining due to low thermal decomposition properties of ethylcellulose. Therefore, use of ethylcellulose unfavorably requires high production energy or takes a lot of time.

For the above reason, ethylcellulose has not been suitably used as a binder resin especially in the case where inorganic fine particles with low heat resistance are used.

On the other hand, Patent Document 1 discloses a paste composition containing an acrylic resin with excellent thermal decomposition properties. The inorganic fine particle-dispersed paste composition containing the acrylic resin can be fired at low temperatures in a short time because of the excellent thermal decomposition properties of the binder resin.

However, even this kind of binder resin needs to be decomposed at a still lower temperature when used in combination with some kinds of inorganic fine particles including a low-melting-point glass such as bismuth oxide having a softening point of 400° C. or lower, electrically conductive fine particles of copper, and silver, which are easily oxidized in sintering, or the like.

In light of the aforementioned problems, examinations have been conducted recently on use of a polyether-based resin such as a polyether resin and an acrylic resin having a polyether side chain as a binder resin. However, when any of the above resins is used as a binder resin, the composition to be obtained can have a sufficient viscosity only when a large amount of the resin is mixed therein. Therefore, the composition ratio of the resin needs to be high in the inorganic fine particle-dispersed paste composition.

Furthermore, although the polyether-based resin is thermally decomposed at a relatively low temperature of 400° C. or lower, since soot generated upon combustion of the ether structure is adsorbed on the surface of the inorganic fine particles and thus a large amount of residual carbon remains in the sintered body to be provided after sintering, it is impossible to take full advantage of the properties of the inorganic fine particles.

Patent Document 1: Japanese Kokai Publication No. Hei-11-71132 (JP-A H11-71132)

DISCLOSURE OF THE INVENTION

Problems to be Solved by the Invention

It is an object of the present invention to provide a binder resin which, when used in an inorganic fine particle-dispersed paste composition, leaves little amount of residual carbon after sintering and can be degreased even under low temperature conditions. It is further an object of the present invention to provide a vehicle composition and an inorganic fine particle-dispersed paste composition, which are obtained by using the binder resin.

Means for Solving the Problems

The present invention provides a binder resin for use in an inorganic fine particle-dispersed paste composition containing inorganic fine particles, which includes from 5 to 55% by weight of a segment derived from methyl methacrylate, from 30 to 80% by weight of a segment derived from isobutyl methacrylate, and from 5 to 20% by weight of a segment derived from polyoxyalkylene ether monomethacrylate.

The following description will discuss the present invention in more detail.

After intensive investigations, the present inventors have found that, surprisingly, a copolymer provided by adding methyl methacrylate to isobutyl methacrylate and polyoxyalkylene ether monomethacrylate while controlling the ratio of those materials in a predetermined range significantly improves the thermal decomposition properties that have been expected to deteriorate. They have also found that the decomposition time, particularly in the case of heating and maintaining the copolymer at 300° C., is considerably shortened. Furthermore, they have found that use of the binder resin having the aforementioned composition can suppress generation of soot during the combustion, which results in reduction of the amount of residual carbon after sintering. Accordingly, the present inventors completed the present invention.

FIG. 1 illustrates a graph showing decomposition properties (TG-DTA) of (A) a methyl methacrylate (MMA) homopolymer, (B) an isobutyl methacrylate (IBMA) homopolymer, (C) a copolymer of 70% by weight of IBMA and 30% by weight of polypropyleneglycol monomethacrylate (PPGMA), and (D) a copolymer of 30% by weight of MMA, 60% by weight of IBMA and 10% by weight of PPGMA, observed when the temperature is raised from 0° C. to 600° C.

As shown in FIG. 1, the homopolymer (A) has lower thermal decomposition properties than the homopolymer (B) or the copolymer (C). In particular, the homopolymer (A) has significantly poor thermal decomposition properties at a temperature of 300° C. or higher.

However, it is shown that the copolymer (D) formulated by adding MMA to the copolymer (C) in the predetermined ratio has significantly improved thermal decomposition properties at a temperature of 300° C. or higher, and has especially excellent thermal decomposition properties at a temperature of around 300° C. This may be because, although the higher-order structure of the polymer affects the decomposition behavior to raise the thermal decomposition temperature in the case of the homopolymer (A), combining the foregoing three kinds of segments each in a predetermined amount allows methyl methacrylate to sufficiently exert its basic low-temperature decomposition properties.

The binder resin of the present invention contains a segment derived from methyl methacrylate, a segment derived from isobutyl methacrylate, and a segment derived from polyoxyalkylene ether monomethacrylate. Inclusion of the foregoing three kinds of segments respectively in the predetermined amounts makes it possible, when the binder resin is used in an inorganic fine particle-containing paste composition, to perform degreasing at low temperatures and also to reduce the amount of residual carbon remaining after sintering.

Meanwhile, degreasing at low temperatures in this description means that 99.5% by weight or more of the binder resin is decomposed relative to its initial weight when it is allowed to stand for one hour at 300° C. under normal atmosphere without nitrogen substitution and the like.

The binder resin of the present invention contains the segment derived from polyoxyalkylene ether monomethacrylate. Inclusion of the segment derived from polyoxyalkylene ether monomethacrylate enables decomposition of the binder resin of the present invention at a temperature of approximately 200° C. in the degreasing process, making it possible to significantly reduce the volume of the binder resin.

The polyoxyalkylene ether monomethacrylate is not particularly limited. Examples thereof include monomethacrylates of polymethylene glycol, polyacetal, polyethylene glycol, polypropylene glycol, polytrimethylene glycol, polytetramethylene glycol, polybutylene glycol, or the like. Among the above examples, polyethylene glycol monomethacryate (repeating unit: PEO), polypropylene glycol monomethacrylate (repeating unit: PPO), polytetramethylene glycol monomethacrylate (repeating unit: PTMO) are preferable.

When the repeating unit is PPO, the binder resin has better decomposition properties and can be decomposed at lower temperatures as compared with the case where the repeating unit is PEO. Thus, it is preferable to use polypropylene glycol monomethacrylate. Moreover, when the repeating unit is PTMO, the amount of soot generated during the sintering is reduced as compared with the case where the repeating unit is PEO. Thus, it is preferable to use a monomethacrylate monomer containing a polytetramethylene glycol chain. On the other hand, when the repeating unit consists only of PTMO, the thermal decomposition properties are slightly inferior to the thermal decomposition properties in the case where the repeating unit is PPO. Thus, it is more preferable to use a monomethacrylate monomer containing a polytetramethylene glycol chain and a polypropylene glycol chain. Furthermore, a copolymer of plural kinds of polyalkylene ethers may be used.

The content of the segment derived from polyoxyalkylene ether monomethacrylate in the binder resin of the present invention is from 5 to 20% by weight. The content of the segment derived from polyoxyalkylene ether monomethacrylate of less than 5% by weight raises the thermal decomposition temperature. Moreover, the segment derived from polyoxyalkylene ether monomethacrylate is more likely to become soot since decomposition of the segment is induced by combustion. Therefore, when the content of the segment derived from polyoxyalkylene ether monomethacrylate exceeds 20% by weight, a large amount of residual carbon may remain after sintering. The content of the segment derived from polyoxyalkylene ether monomethacrylate is preferably from 5 to less than 10% by weight.

The binder resin of the present invention contains the segment derived from methyl methacrylate.

The resin obtainable by polymerization of the methyl methacrylate is basically decomposed at low temperatures; however, the higher-order structure of the resin causes an increase in the decomposition temperature. When methyl methacrylate is copolymerized with isobutyl methacrylate, the higher-order structure including methyl methacrylate is prevented, and consequently the resin can sufficiently exert the low-temperature decomposition properties and can be degreased at lower temperatures.

The segment derived from methyl methacrylate and the segment derived from isobutyl methacrylate are thermally decomposed due to depolymerization, and the decomposed volatiles form respective monomers.

It is considered that methyl methacrylate may reduce molecular weight of decomposition gases which are generated upon copolymerization with polyoxyalkylene ether methacrylate and may reduce adsorption of the decomposed product on the surface of inorganic fine particles after degreasing.

According to the present invention, the combination of the segment derived from methyl methacrylate with the segments derived from isobutyl methacrylate and polyoxyalkylene ether monomethacrylate, and the further arrangement to set the content of each of the segments to a predetermined amount make it possible for the segment derived from methyl methacrylate to sufficiently exert its basic low-temperature decomposition properties. As a result, it becomes possible to perform degreasing at lower temperatures.

The content of the segment derived from methyl methacrylate in the binder resin of the present invention is from 5 to 55% by weight. The content of the segment derived from methyl methacrylate of less than 5% by weight leaves a large amount of residual carbon after sintering, while the content of more than 55% by weight raises the thermal decomposition temperature. The content of the segment derived from methyl methacrylate is preferably from 10 to 55% by weight.

In the case where the content of the segment derived from polyoxyalkylene ether monomethacrylate is 10% by weight, the content of the segment derived from methyl methacrylate is preferably from 10 to 50% by weight. The content of the segment derived from methyl methacrylate of less than 10% by weight may increase the molecular weight of the decomposition gases which are generated during the firing due to the depolymerization. As a result, the decomposed products in the decomposition gases tend to be adsorbed on the surface of the inorganic fine particles, and thus the amount of residual carbon remaining after sintering may be increased. The content of the segment derived from methyl methacrylate of more than 50% by weight may increase the thermal decomposition temperature. The content of the segment derived from methyl methacrylate is preferably from 15 to 45% by weight.

Moreover, in the case where the content of the segment derived from polyoxyalkylene ether methacrylate is 5% by weight, the content of the segment derived from methyl methacrylate is preferably from 15 to 35% by weight. The content of the segment derived from methyl methacrylate of less than 15% by weight may increase the molecular weight of the decomposition gases which are generated during the firing due to the depolymerization. As a result, the decomposed products in the decomposition gases tend to be adsorbed on the surface of the inorganic fine particles, and thus the amount of residual carbon remaining after sintering may be increased. The content of the segment derived from methyl methacrylate of more than 35% by weight may increase the thermal decomposition temperature. The content of the segment derived from methyl methacrylate is preferably from 20 to 30% by weight.

The binder resin of the present invention contains a segment derived from isobutyl methacrylate. Inclusion of the segment derived from isobutyl methacrylate makes it possible for the segment derived from methyl methacrylate to sufficiently exert its basic low-temperature decomposition properties.

Furthermore, although increase in the number of carbons in an acrylic side chain generally raises the thermal decomposition temperature of the resin, the thermal decomposition temperature can be lowered when the number of carbons in the acrylic side chain is reduced by combining the segment derived from methyl methacrylate and the segment derived from isobutyl methacrylate.

The content of the segment derived from isobutyl methacrylate in the binder resin of the present invention is from 30 to 80% by weight. The content of the segment derived from isobutyl methacrylate of less than 30% by weight leaves a large amount of residual carbon after sintering, while the content of the segment derived from isobutyl methacrylate of more than 80% by weight raises the thermal decomposition temperature. The content of the segment derived from isobutyl methacrylate is preferably from 35 to 75% by weight.

In order to prevent the thermal decomposition temperature from increasing due to the higher-order structure of the segment derived from methyl methacrylate, the ratio of the segment derived from isobutyl methacrylate is preferably made larger than the ratio of the segment derived from methyl methacrylate in the resin.

In the case where the content of the segment derived from polyoxyalkylene ether monomethacrylate is 10% by weight, the content of the segment derived from isobutyl methacrylate is preferably from 40 to 80% by weight. The content of the segment derived from isobutyl methacrylate of less than 40% by weight may raise the thermal decomposition temperature. The content of the segment derived from isobutyl methacrylate of more than 80% by weight may lower the glass transition temperature (Tg) of the resin. As a result, the binder resin may not have enough viscosity-increasing effects as a binder resin to be used for a paste, and thus a larger amount of the resin may be required in the paste. The content of the segment derived from isobutyl methacrylate is preferably from 45 to 75% by weight.

Moreover, in the case where the content of the segment derived from polyoxyalkylene ether monomethacrylate is 5% by weight, the content of the segment derived from isobutyl methacrylate is preferably from 60 to 80% by weight. The content of the segment derived from isobutyl methacrylate of less than 60% by weight raises the thermal decomposition temperature. The content of the segment derived from isobutyl methacrylate of more than 80% by weight may lower the glass transition temperature (Tg) of the resin. As a result, the binder resin may not have enough viscosity-increasing effects to be used for a paste, and thus a larger amount of the resin may be required in the paste. The content of the segment derived from isobutyl methacrylate is preferably from 65 to 75% by weight.

The binder resin of the present invention may contain a segment derived from a monomer having a polar group so as to obtain a desired function to an extent that the effects of the present invention are not ruined, in addition to the segment derived from methyl methacrylate, the segment derived from isobutyl methacrylate, and the segment derived from polyoxyalkylene ether monomethacrylate.

The monomer having a polar group is not particularly limited. Examples thereof include 2-hydroxyethyl methacrylate, hydroxypropyl methacrylate, methacrylic acid, glycidyl methacrylate, glycerol monomethacrylate, and the like.

In the case where the segment derived from the monomer having a polar group is contained, the content of the segment derived from the monomer having a polar group is preferably less than 5% by weight. The content of the segment derived from the monomer having a polar group of 5% by weight or more may ruin the thermal decomposition properties at low temperatures, increase soot attached to the inorganic fine particles, or leave a large amount of residual carbon in a sintered body.

The binder resin of the present invention preferably contains at least one hydrogen-bonding functional group only at molecular terminals. Existence of the hydrogen-bonding functional group only at the molecular terminals allows an inorganic fine particle-dispersed paste composition formed by using the resin to assuredly have an appropriate viscosity, without necessity of a large amount of the resin, while not ruining the effects of the present invention such as low-temperature decomposition properties.

The hydrogen-bonding functional group is not particularly limited. Examples thereof include hydroxy group, carboxyl group, amino group, and the like. Hydroxy group and carboxyl group are preferable among the examples partly because they are little affected by thermal decomposition. Although inclusion of the at least one hydrogen-bonding functional group is sufficient, the more the functional group is included, the more the phase separation structure stabilizes, and thus the dispersibility of inorganic fine particles in the inorganic fine particle-dispersed paste composition is improved.

The binder resin of the present invention preferably has a weight average molecular weight of from 20000 to less than 70000 on the polystyrene equivalent basis. When the binder resin with a weight average molecular weight of less than 20000 on the polystyrene equivalent basis is used, an inorganic fine particle-dispersed paste composition to be produced may have an insufficient viscosity. When the binder resin with a weight average molecular weight of 70000 or more on the polystyrene equivalent basis is used, the inorganic fine particle-dispersed paste composition to be produced may have problems in its stringiness or printability.

The weight average molecular weight of the binder resin on the polystyrene equivalent basis can be measured by GPC analysis employing a column such as Column LF-804 manufactured by SHOKO Co., Ltd.

The method for producing the binder resin of the present invention is not particularly limited, and the following method may be exemplified: methyl methacrylate, isobutyl methacrylate, and polyoxyalkylene ether monomethacrylate are used as raw material monomers to prepare a monomer mixed solution containing a chain transfer agent, an organic solvent and the like, and then a polymerization initiator is added to the monomer mixed solution to copolymerize the raw material monomers with one another.

Examples of the method for introducing a hydrogen-bonding functional group only at molecular terminals of the binder resin of the present invention include: a method in which the foregoing material monomers including methyl methacrylate, isobutyl methacrylate, and polyoxyalkylene ether monomethacrylate are copolymerized with one another in the presence of a chain transfer agent having a hydrogen-bonding functional group by a known technique such as a free-radical polymerization method, a living radical polymerization method, an iniferter polymerization method, an anion polymerization method, and a living anion polymerization method; a method in which the foregoing material monomers are copolymerized with one another in the presence of a polymerization initiator having a hydrogen-bonding functional group by a known technique such as a free-radical polymerization method, a living radical polymerization method, an iniferter polymerization method, an anion polymerization method, and a living anion polymerization method; and the like. Those methods may be employed in combination.

The introduction of the hydrogen-bonding functional group only to the molecular terminals of the binder resin may be confirmed by, for example, $^{13}$C-NMR.

The chain transfer agent having a hydrogen-bonding functional group is not particularly limited. Examples thereof include: mercapto propanediol containing a hydroxy group as a hydrogen-bonding functional group; thioglycerol, mercaptosuccinic acid, or mercapto acetic acid each containing a carboxyl group as a hydrogen-bonding functional group; aminoethanethiol containing an amino group as a hydrogen-bonding functional group, and the like.

The polymerization initiator having a hydrogen-bonding functional group is not particularly limited. Examples thereof include p-menthane hydroperoxide (Permenta H, manufactured by NOF Corp.), diisopropyl benzene hydroperoxide (Percumyl P, manufactured by NOF Corp.), 1,2,3,3-tetramethylbutyl hydroxyperoxide (Perocta H, manufactured by NOF Corp.), cumene hydroperoxide (Percumyl H-80, manufactured by NOF Corp.), t-butylhydroperoxide (Perbutyl H-69, manufactured by NOF Corp.), cyclohexanone peroxide (Perhexa H, manufactured by NOF Corp.), 1,1,3,3-tetramethylbutyl hydroperoxide, t-butyl hydroperoxide, t-amyl hydroperoxide, disuccinic acid peroxide (Peroyl SA), and the like.

A vehicle composition containing the binder resin of the present invention and an organic solvent is also one aspect of the present invention.

The organic solvent is not particularly limited. Examples thereof include ethylene glycol ethylether, ethylene glycol monobutylether, ethylene glycol monoethylether acetate, diethylene glycol monoethylether, diethylene glycol monomethyl ether, diethylene glycol monoisobutyl ether, trimethyl pentanediol monoisobutyrate, butyl carbitol, butyl carbitol acetate, terpineol, terpineol acetate, dihydroterpineol, dihydroterpineol acetate texanol, isophorone, butyl lactate, dioctyl phthalate, dioctyl adipate, benzyl alcohol, phenyl propylene glycol, cresol, terpene compound having a high viscosity, N-methyl pyrrolidone, 3-methoxy-3-methyl-1-butanol, 3-methyl-1,5-pentanediol, 2,4-diethyl-1,5-pentanediol, 2-ethyl-1,3-hexanediol, and the like.

Among those examples, preferable examples are terpineol acetate, dihydro terpineol, dihydro terpineol acetate, diethylene glycol monoethyl ether, diethylene glycol monomethyl ether, diethylene glycol monoisobutyl ether, butyl carbitol, butyl carbitol acetate, and texanol. More preferable examples are terpineol, terpineol acetate, dihydroterpineol, and dihydroterpineol acetate. Those organic solvents each may be used solely or in combination of two ore more kinds thereof.

The organic solvent preferably has a boiling point of 150° C. or higher. The boiling point of lower than 150° C. may cause evaporation of the organic solvent in printing process. As a result, the viscosity of the paste may be increased and thus it may become impossible to perform printing.

The vehicle composition of the present invention may further include ethylcellulose. Inclusion of a trace amount of ethylcellulose can further improve the dispersibility of the inorganic fine particles and the viscosity-increasing properties of the vehicle composition. The ethylcellulose to be added is not particularly limited but an ethylcellulose of from STD 10 to STD 45 is preferable because of the excellent sintering properties.

The content of the binder resin in the vehicle composition of the present invention is not particularly limited; however, the content is preferably 5% by weight in the lower limit and 30% by weight in the upper limit. When the content of the binder resin is set within the foregoing range, it is possible to produce the inorganic fine particle-dispersed paste composition that can be degreased even by firing at low temperatures.

In the case where ethylcellulose is added, it is preferable that the content of ethylcellulose be set from 5 to 20% by weight relative to the total amount of the binder resin. When the content of ethylcellulose is less than 5% by weight, the effect produced by addition of ethylcellulose may be hardly expressed. The content of more than 20% by weight of ethylcellulose may have a negative effect on the sintering properties when the vehicle composition is used for the inorganic fine particle-dispersed paste composition.

The content of the organic solvent in the vehicle composition of the present invention is not particularly limited; however, the content is preferably 5% by weight in the lower limit and 60% by weight in the upper limit. The content of the organic solvent out of this range may make it difficult to disperse the inorganic fine particles.

It is possible to produce an inorganic fine particle-dispersed paste composition by using the vehicle composition of the present invention and inorganic fine particles. The inorganic fine particle-dispersed paste composition to be obtained is also one aspect of the present invention.

The inorganic fine particles are not particularly limited. Examples thereof include copper, silver, nickel, gold, platinum, palladium, alumina, zirconia, titanium oxide, barium titanate, magnesium oxide, tin oxide, ITO, alumina nitride, silicon nitride, boron nitride, silicate glass, lead glass, $CaO—Al_2O_3—SiO_2$ type inorganic glass, $MgO—Al_2O_3—SiO_2$ type inorganic glass, $LiO_2—Al_2O_3—SiO_2$ type inorganic glass, low-melting-point glass, fluorescent materials, inorganic pigments, various kinds of carbon blacks, carbon nanotubes, metal complexes, metal complex salts of transition metals.

The low-melting-point glass is not particularly limited. Examples thereof include phosphate glass, zinc glass, boron-type glass, and the like.

The fluorescent materials are not particularly limited. Examples thereof include $BaMgAl_{10}O_{17}$:Eu, $Zn_2SiO_4$:Mn, $(Y,Gd)BO_3$:Eu, and the like.

The transition metal used for the metal complex salts of transition metals is not particularly limited. Examples thereof include Zn, Cu, Co, Ni, Hg, Pd, and the like.

The content of the inorganic fine particles in the inorganic fine particle-dispersed paste composition of the present invention is not particularly limited; however, the content is preferably 10% by weight in the lower limit and 90% by weight in the upper limit. The content of the inorganic fine particles of less than 10% by weight may result in an insufficient viscosity of the inorganic fine particle-dispersed paste composition. The content of the inorganic fine particles of more than 90% by weight may make it difficult to disperse the inorganic fine particles in the inorganic fine particle-dispersed paste composition.

The inorganic fine particle-dispersed paste composition of the present invention can be desirably used as a glass paste composition when the inorganic fine particles are glass powders. When ceramic powders are used as the inorganic fine particles, the resulting paste composition can be desirably used as a ceramic paste composition. Similarly, when fluorescent powders are used as the inorganic fine particles, the resulting paste composition can be desirably used as a fluorescent paste composition, and when electrically conductive powders are used, the paste composition can be desirably used as an electrically conductive paste composition. Furthermore, when glass powders or ceramic powers are used as the inorganic fine particles, the resulting paste composition can be desirably used as a material for a green sheet. When the inorganic fine particle-dispersed paste composition of the present invention is used in the foregoing use, it becomes possible to perform degreasing at low temperatures and to reduce oxidation of the inorganic fine particles to a minimum level.

Effects of the Invention

The binder resin of the present invention, which contains the segments derived from methyl methacrylate, isobutyl methacrylate, and polyoxyalkylene ether monomethacrylate each in an amount within a predetermined range, can significantly improve the thermal decomposition properties. Therefore, use of the binder resin in the inorganic fine particle-dispersed paste composition makes it possible to perform degreasing in a low temperature system of, for example, less than 300° C. and to prevent generation of soot during the firing so that the amount of residual carbon after sintering can be reduced.

BEST MODE FOR CARRYING OUT THE INVENTION

Following description will further discuss the present invention in detail with reference to Examples, though the present invention is not limited to those Examples.

Example 1

(Production of Binder Resin)

A monomer-mixed solution was obtained by mixing: 25 parts by weight of methyl methacrylate (MMA), 70 parts by weight of isobutyl methacrylate (IBMA) and 5 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent, in a 2 L-separable flask equipped with a stirrer, a condenser, a thermometer, a hot water bath, and a nitrogen gas introduction inlet.

After the thus obtained monomer mixed solution was bubbled with nitrogen gas for 20 minutes to remove dissolved oxygen, the system in the separable flask was replaced with nitrogen gas and heated until the hot water bath boiled while stirring. To the resulting solution was added a solution of a polymerization initiator diluted with ethyl acetate to start polymerization. The ethyl acetate solution containing the polymerizaiton initiator was added several times during the polymerization.

After seven hours from the initiation of the polymerization, the resulting solution was cooled to room temperature to quench the polymerization. The resulting polymerization solution was spread on a stainless steel vat and dried in an oven at 100° C. for 12 hours. As a result, a binder resin was produced.

(Production of Vehicle Composition)

A vehicle composition was produced by adding 7 parts by weight of terpiniol to 8 parts by weight of the binder resin thus obtained and then dispersing the resulting mixture using a high speed disperser.

(Production of Inorganic Fine Particle-Dispersed Paste Composition)

An amount of 85 parts by weight of a low-melting-point glass frit with a softening point of 360° C. as inorganic fine particles was added to 15 parts by weight of the above obtained vehicle composition. The resulting mixture was sufficiently kneaded by using a high speed agitator and then treated with a three-roll mill until it was smoothed. As a result, an inorganic fine particle-dispersed paste composition was produced.

Example 2

A binder resin, a vehicle composition and an inorganic fine particle-dispersed paste composition were produced in the same manner as in Example 1, except that, in the process of (Production of Binder Resin), a monomer-mixed solution was produced by mixing: 15 parts by weight of methyl methacrylate (MMA), 80 parts by weight of isobutyl methacrylate (IBMA) and 5 parts by weight of polypropylene glycol monomethacrylate (Blemmer PP1000, manufactured by NOF Corp.) as monomers; 1.0 part by weight of mercapto-succinic acid as a chain transfer agent; and 100 parts by weight of ethyl acetate as an organic solvent.

Example 3

A binder resin, a vehicle composition and an inorganic fine particle-dispersed paste composition were produced in the same manner as in Example 1, except that, in the process of (Production of Binder Resin), a monomer-mixed solution was produced by mixing: 40 parts by weight of methyl methacrylate (MMA), 50 parts by weight of isobutyl methacrylate (IBMA) and 10 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Example 4

A binder resin, a vehicle composition and an inorganic fine particle-dispersed paste composition were produced in the same manner as in Example 1, except that, in the process of (Production of Binder Resin), a monomer-mixed solution was produced by mixing: 10 parts by weight of methyl methacrylate (MMA), 80 parts by weight of isobutyl methacrylate (IBMA) and 10 parts by weight of polypropylene glycol monomethacrylate (Blemmer PP1000, manufactured by NOF Corp.) as monomers; 1.0 part by weight of mercaptosuccinic acid as a chain transfer agent; and 100 parts by weight of ethyl acetate as an organic solvent.

Example 5

A binder resin, a vehicle composition and an inorganic fine particle-dispersed paste composition were produced in the same manner as in Example 1, except that, in the process of (Production of Binder Resin), a monomer-mixed solution was produced by mixing: 55 parts by weight of methyl methacrylate (MMA), 30 parts by weight of isobutyl methacrylate (IBMA) and 15 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Example 6

A binder resin, a vehicle composition and an inorganic fine particle-dispersed paste composition were produced in the same manner as in Example 1, except that, in the process of (Production of Binder Resin), a monomer-mixed solution was produced by mixing: 5 parts by weight of methyl methacrylate (MMA), 80 parts by weight of isobutyl methacrylate (IBMA) and 15 parts by weight of polypropylene glycol monomethacrylate (Blemmer PP1000, manufactured by NOF Corp.) as monomers; 1.0 part by weight of mercaptosuccinic acid as a chain transfer agent; and 100 parts by weight of ethyl acetate as an organic solvent.

Example 7

A binder resin, a vehicle composition and an inorganic fine particle-dispersed paste composition were produced in the same manner as in Example 1, except that, in the process of (Production of Binder Resin), a monomer-mixed solution was produced by mixing: 18 parts by weight of methyl methacrylate (MMA), 75 parts by weight of isobutyl methacrylate (IBMA) and 7 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Example 8

A binder resin, a vehicle composition and an inorganic fine particle-dispersed paste composition were produced in the same manner as in Example 1, except that, in the process of (Production of Binder Resin), a monomer-mixed solution was produced by mixing: 28 parts by weight of methyl methacrylate (MMA), 60 parts by weight of isobutyl methacrylate (IBMA) and 12 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Example 9

A binder resin was produced in the same manner as in Example 1, except that, in the process of (Production of Binder Resin), a monomer-mixed solution was produced by mixing: 30 parts by weight of methyl methacrylate (MMA), 60 parts by weight of isobutyl methacrylate (IBMA) and 10 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent. Thereafter, 0.3 parts by weight of ethylcellulose (STD 10, manufactured by WAKO CHEMICAL LTD.) and 8.5 parts by weight of terpineol were added to 6.2 parts by weight of the above obtained binder resin, and then dispersed in the binder resin using a high speed disperser to produce a vehicle composition. Further, an inorganic fine particle-dispersed paste composition was produced in the same manner as in Example 1.

Example 10

A binder resin, a vehicle composition and an inorganic fine particle-dispersed paste composition were produced in the same manner as in Example 1, except that, in the process of (Production of Binder Resin), a monomer-mixed solution was produced by mixing: 25 parts by weight of methyl methacrylate (MMA), 55 parts by weight of isobutyl methacrylate (IBMA) and 20 parts by weight of monomethacrylate containing polytetramethylene glycol chain (Blemmer 10PPB-500B, manufactured by NOF Corp.) as monomers; 0.3 parts by weight of mercapto propanediol as a chain transfer agent; and 100 parts by weight of ethyl acetate as an organic solvent.

Comparative Example 1

A binder resin, a vehicle composition and an inorganic fine particle-dispersed paste composition were produced in the same manner as in Example 1, except that, in the process of (Production of Binder Resin), a monomer-mixed solution was produced by mixing 100 parts by weight of isobutyl methacrylate (IBMA) as a monomer, 0.05 parts by weight of dodecanethiol as a chain transfer agent, and 100 parts by weight of ethyl acetate as an organic solvent.

Comparative Example 2

A binder resin, a vehicle composition and an inorganic fine particle-dispersed paste composition were produced in the same manner as in Example 1, except that, in the process of (Production of Binder Resin), a monomer-mixed solution was produced by mixing 100 parts by weight of methyl methacrylate (MMA) as a monomer, 0.05 parts by weight of dodecanethiol as a chain transfer agent, and 100 parts by weight of ethyl acetate as an organic solvent.

Comparative Example 3

A binder resin, a vehicle composition and an inorganic fine particle-dispersed paste composition were produced in the same manner as in Example 1, except that, in the process of (Production of Binder Resin), a monomer-mixed solution was produced by mixing 85 parts by weight of isobutyl methacrylate (IBMA) and 15 parts by weight of polyethylene glycol monomethacrylate (Blemmer PE90, manufactured by NOF Corp.) as monomers, 0.3 parts by weight of mercapto propanediol as a chain transfer agent, and 100 parts by weight of ethyl acetate as an organic solvent.

Comparative Example 4

A binder resin, a vehicle composition and an inorganic fine particle-dispersed paste composition were produced in the same manner as in Example 1, except that, in the process of (Production of Binder Resin), a monomer-mixed solution was produced by mixing 85 parts by weight of methyl methacrylate (MMA) and 15 parts by weight of polyethylene glycol monomethacrylate (Blemmer PE90, manufactured by NOF Corp.) as monomers, 1.0 part by weight of mercaptosuccinic acid as a chain transfer agent, and 100 parts by weight of ethyl acetate as an organic solvent.

Comparative Example 5

A binder resin, a vehicle composition and an inorganic fine particle-dispersed paste composition were produced in the same manner as in Example 1, except that, in the process of (Production of Binder Resin), a monomer-mixed solution was produced by mixing: 10 parts by weight of methyl methacrylate (MMA), 85 parts by weight of isobutyl methacrylate (IBMA) and 5 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Comparative Example 6

A binder resin, a vehicle composition and an inorganic fine particle-dispersed paste composition were produced in the same manner as in Example 1, except that, in the process of (Production of Binder Resin), a monomer-mixed solution was produced by mixing: 5 parts by weight of methyl methacrylate (MMA), 85 parts by weight of isobutyl methacrylate (IBMA) and 10 parts by weight of polypropylene glycol monomethacrylate (Blemmer PP1000, manufactured by NOF Corp.) as monomers; 1.0 part by weight of mercaptosuccinic acid as a chain transfer agent; and 100 parts by weight of ethyl acetate as an organic solvent.

Comparative Example 7

A binder resin, a vehicle composition and an inorganic fine particle-dispersed paste composition were produced in the same manner as in Example 1, except that, in the process of (Production of Binder Resin), a monomer-mixed solution was produced by mixing: 60 parts by weight of methyl methacrylate (MMA), 25 parts by weight of isobutyl methacrylate (IBMA) and 15 parts by weight of polypropylene glycol monomethacrylate (Blemmer PP1000, manufactured by NOF Corp.) as monomers; 0.3 parts by weight of mercapto propanediol as a chain transfer agent; and 100 parts by weight of ethyl acetate as an organic solvent.

Comparative Example 8

A binder resin, a vehicle composition and an inorganic fine particle-dispersed paste composition were produced in the same manner as in Example 1, except that, in the process of (Production of Binder Resin), a monomer-mixed solution was produced by mixing: 85 parts by weight of isobutyl methacrylate (IBMA) and 15 parts by weight of polypropylene glycol monomethacrylate (Blemmer PP1000, manufactured by NOF Corp.) as monomers; 1.0 part by weight of mercaptosuccinic acid as a chain transfer agent; and 100 parts by weight of ethyl acetate as an organic solvent.

Comparative Example 9

A binder resin, a vehicle composition and an inorganic fine particle-dispersed paste composition were produced in the same manner as in Example 1, except that, in the process of (Production of Binder Resin), a monomer-mixed solution was produced by mixing: 60 parts by weight of methyl methacrylate (MMA), 20 parts by weight of isobutyl methacrylate (IBMA) and 20 parts by weight of monomethacrylate containing polytetramethylene glycol chain (Blemmer 10PPB-500B, manufactured by NOF Corp.) as monomers; 0.05 parts by weight of dodecanethiol as a chain transfer agent; and 100 parts by weight of ethyl acetate as an organic solvent.

Comparative Example 10

A binder resin, a vehicle composition and an inorganic fine particle-dispersed paste composition were produced in the same manner as in Example 1, except that, in the process of (Production of Binder Resin), a monomer-mixed solution was produced by mixing: 20 parts by weight of methyl methacrylate (MMA), 50 parts by weight of isobutyl methacrylate (IBMA) and 30 parts by weight of monomethacrylate containing polytetramethylene glycol chain (Blemmer 10PPB-500B, manufactured by NOF Corp.) as monomers; 0.05 parts by weight of dodecanethiol as a chain transfer agent; and 100 parts by weight of ethyl acetate as an organic solvent.

(Evaluation)

Evaluation was performed on the binder resins and the inorganic fine particle-dispersed paste compositions obtained in Examples and Comparative Examples according to the method mentioned below. Tables 1 and 2 show the results.

(1) Measurement of Average Molecular Weight

Weight average molecular weights of the thus obtained binder resins on the polystyrene equivalent basis were measured by gel permeation chromatography analysis using Column LF-804 (manufactured by SHOKO, Ltd.).

(2) Evaluation of Viscosity

Viscosities of the thus obtained inorganic fine particle-dispersed paste compositions were measured at room temperature using a B-model viscometer (DVII+Pro, manufactured by Brookfield Engineering Laboratories, Inc.) set at a rotation frequency of 10 rpm. Since a certain viscosity is necessary to prevent settling of glass particles, the results were evaluated and shown in Tables 1 and 2 based on the following criteria.

○: Viscosity was 10 Pa·s or more.

x: Viscosity was less than 10 Pa·s.

(3) Decomposition Temperature (TG-DTA Evaluation)

Decomposition properties of the thus obtained binder resins were evaluated after the temperature of the binder resins had been raised to 300° C. at a rate of 10° C./min under air atmosphere using a thermal decomposition analyzer (Simultaneous SDT 2960, manufactured by TA Instruments) and allowed to stand for 60 minutes in the same condition. The following criteria were used for the evaluation.

○: The resin was 100% decomposed within 60 minutes.

Δ: The resin was 95% or more decomposed in 60 minutes.

x: The resin was less than 95% decomposed in 60 minutes.

The finish time of the decomposition is also shown when the resin was 100% decomposed within 60 minutes.

(4) Sintering Properties

Each of the thus obtained inorganic fine particle-dispersed composition was applied on a glass substrate in a thickness of 10 mm using an applicator, and then cured in an oven at 150° C. for 60 minutes to evaporate terpineol so that a layer of glass particles was prepared. The resulting glass particle layer was heated in an oven at 300° C. for 60 minutes to degrease the binder resin and further heated up to 450° C. to completely dissolve the glass frit. Coloration and presence of varnish of the thus obtained glass plate were checked by eye observation and evaluated according to the following criteria.

○: The glass plate had varnish that was characteristic of glass.

x: The glass plate had no varnish.

TABLE 1

| | binder resin (parts by weight) | | | | | | | | vehicle composition (parts by weight) | | |
|---|---|---|---|---|---|---|---|---|---|---|---|
| | monomer | | | | | chain transfer agent | | | | | |
| | methyl meth-acrylate | isobutyl meth-acrylate | polypropylene-glycol monometh-acrylate | polyethylene-glycol monometh-acrylate | monometh-acrylate containing polytetramethylene-glycol chain | mercapto-propane-diol | mercapto-succinic acid | dodecane-thiol | binder resin | ethyl cellu-lose | ter-pineol |
| Example 1 | 25 | 70 | 5 | — | — | 0.3 | — | — | 8 | — | 7 |
| Example 2 | 15 | 80 | 5 | — | — | — | 1.0 | — | 8 | — | 7 |
| Example 3 | 40 | 50 | 10 | — | — | 0.3 | — | — | 8 | — | 7 |
| Example 4 | 10 | 80 | 10 | — | — | — | 1.0 | — | 8 | — | 7 |
| Example 5 | 55 | 30 | 15 | — | — | 0.3 | — | — | 8 | — | 7 |
| Example 6 | 5 | 80 | 15 | — | — | — | 1.0 | — | 8 | — | 7 |
| Example 7 | 18 | 75 | 7 | — | — | 0.3 | — | — | 8 | — | 7 |
| Example 8 | 28 | 60 | 12 | — | — | 0.3 | — | — | 8 | — | 7 |
| Example 9 | 30 | 60 | 10 | — | — | 0.3 | — | — | 8.2 | 0.3 | 8.5 |
| Example 10 | 25 | 55 | — | — | 20 | 0.3 | — | — | 8 | — | 7 |

| | inorganic fine particle-dispersed paste composition (parts by weight) | | Evaluation | | | | | | |
|---|---|---|---|---|---|---|---|---|---|
| | | | weight average molecular weight | viscosity | | TG-DTA | | sintering properties | |
| | vehicle composition | glass frit | | 10 rpm (Pa · s) | viscosity-increasing properties | thermal decompo-sition properties | finish time of decompo-sition (minutes) | coloration | surface condition |
| Example 1 | 15 | 85 | 70000 | 30 | ○ | ○ | 25 | no color | ○ |
| Example 2 | 15 | 85 | 70000 | 25 | ○ | ○ | 30 | no color | ○ |
| Example 3 | 15 | 85 | 70000 | 40 | ○ | ○ | 40 | no color | ○ |
| Example 4 | 15 | 85 | 70000 | 15 | ○ | ○ | 25 | no color | ○ |
| Example 5 | 15 | 85 | 70000 | 45 | ○ | ○ | 35 | no color | ○ |
| Example 6 | 15 | 85 | 70000 | 12 | ○ | ○ | 40 | no color | ○ |
| Example 7 | 15 | 85 | 70000 | 27 | ○ | ○ | 40 | no color | ○ |
| Example 8 | 15 | 85 | 70000 | 35 | ○ | ○ | 30 | no color | ○ |
| Example 9 | 15 | 85 | 70000 | 30 | ○ | ○ | 25 | no color | ○ |
| Example 10 | 15 | 85 | 70000 | 30 | ○ | ○ | 20 | no color | ○ |

TABLE 2

| | binder resin (parts by weight) | | | | | | | | vehicle composition (parts by weight) | | |
|---|---|---|---|---|---|---|---|---|---|---|---|
| | monomer | | | | | chain transfer agent | | | | | |
| | methyl meth-acrylate | isobutyl meth-acrylate | polypropylene-glycol monometh-acrylate | polyethylene-glycol monometh-acrylate | monometh-acrylate containing polytetramethylene-glycol chain | mercapto-propane-diol | mercapto-succinic acid | dodecane-thiol | binder resin | ethyl cellu-lose | ter-pineol |
| Comparative Example 1 | — | 100 | — | — | — | — | — | 0.05 | 8 | — | 7 |
| Comparative Example 2 | 100 | — | — | — | — | — | — | 0.05 | 8 | — | 7 |
| Comparative Example 3 | — | 85 | — | 15 | — | 0.3 | — | — | 8 | — | 7 |
| Comparative Example 4 | 85 | — | — | 15 | — | — | 1.0 | — | 8 | — | 7 |
| Comparative Example 5 | 10 | 85 | 5 | — | — | 0.3 | — | — | 8 | — | 7 |
| Comparative Example 6 | 5 | 85 | 10 | — | — | — | 1.0 | — | 8 | — | 7 |
| Comparative Example 7 | 60 | 25 | 15 | — | — | 0.3 | — | — | 8 | — | 7 |
| Comparative Example 8 | — | 85 | 15 | — | — | — | 1.0 | — | 8 | — | 7 |
| Comparative Example 9 | 60 | 20 | — | — | 20 | — | — | 0.05 | 8 | — | 7 |

TABLE 2-continued

| | | | | | | | | | | | |
|---|---|---|---|---|---|---|---|---|---|---|---|
| Comparative Example 10 | 20 | 50 | — | — | 30 | — | — | 0.05 | 8 | — | 7 |

| | Evaluation | | | | | | | | |
|---|---|---|---|---|---|---|---|---|---|
| | inorganic fine particle-disparsed paste composition (parts by weight) | | weight average | viscosity | | TG-DTA | | sintering properties | |
| | vehicle composition | glass frit | molecular weight | 10 rpm (Pa · s) | viscosity-increasing properties | thermal decomposition properties | finish time of decomposition (minutes) | coloration | surface condition |
| Comparative Example 1 | 15 | 85 | 100000 | 20 | ○ | x | not finished | pale yellow | x (frosted) |
| Comparative Example 2 | 15 | 85 | 100000 | 60 | ○ | x | not finished | pale yellow | x (fronted) |
| Comparative Example 3 | 15 | 85 | 100000 | 15 | ○ | Δ | not finished | brownish-red | x (uneven, frosted) |
| Comparative Example 4 | 15 | 85 | 100000 | 45 | ○ | Δ | not finished | brownish-red | x (uneven, frosted) |
| Comparative Example 5 | 15 | 85 | 70000 | 7 | x | Δ | not finished | pale yellow | x (frosted) |
| Comparative Example 6 | 15 | 85 | 70000 | 5 | x | Δ | not finished | brownish-red | x (uneven, frosted) |
| Comparative Example 7 | 15 | 85 | 70000 | 50 | ○ | x | not finished | brownish-red | x (uneven, frosted) |
| Comparative Example 8 | 15 | 85 | 70000 | 10 | x | Δ | not finished | brownish-red | x (uneven, frosted) |
| Comparative Example 9 | 15 | 85 | 100000 | 60 | ○ | x | not finished | pale yellow | x (frosted) |
| Comparative Example 10 | 15 | 85 | 100000 | 30 | ○ | x | not finished | pale yellow | x (frosted) |

INDUSTRIAL APPLICABILITY

According to the present invention, it is possible to provide a binder resin which, when used in an inorganic fine particle-dispersed paste composition, leaves little amount of residual carbon after sintering and can be degreased even under low temperature conditions. Moreover, according to the present invention, it is also possible to provide a vehicle composition and an inorganic fine particle-dispersed paste composition, which are obtained by using the binder resin.

BRIEF DESCRIPTION OF THE DRAWINGS

FIG. 1 illustrates a graph showing thermal decomposition behaviors (TG-DTA) of respective kinds of acrylic resins.

The invention claimed is:

1. An inorganic fine particle-dispersed paste composition for producing a sintered body, comprising a vehicle composition and inorganic fine particles, wherein the vehicle composition comprises:

a binder resin comprising a copolymer formed from:

5 to 55% by weight of methyl methacrylate, 30 to 80% by weight of isobutyl methacrylate, and 5 to 20% by weight of polyoxyalkylene monomethacrylate;

and at least one organic solvent selected from the group consisting of terpineol, terpineol acetate, dihydroterpineol, and dihydroterpineol acetate.

2. The inorganic fine particle-dispersed paste composition according to claim 1, wherein the polyoxyalkylene monomethacrylate has a polyoxyalkylene chain containing a polytetramethylene glycol chain.

3. The inorganic fine particle-dispersed paste composition according to claim 1, wherein the binder resin has a weight average molecular weight of from 20000 to 70000 on a polystyrene equivalent basis.

4. The inorganic fine particle-dispersed paste composition according to claim 1, wherein the vehicle composition further comprises ethylcellulose.

* * * * *